3,197,583
ELECTRICAL CONNECTOR FOR SECONDARY CIRCUITS
Edwin C. Goodwin, Jr., Canton, and Ira W. Paterson, Milton, Mass., assignors to Allis Chalmers Manufacturing Company, Milwaukee, Wis.
Filed Dec. 19, 1962, Ser. No. 245,810
1 Claim. (Cl. 200—50)

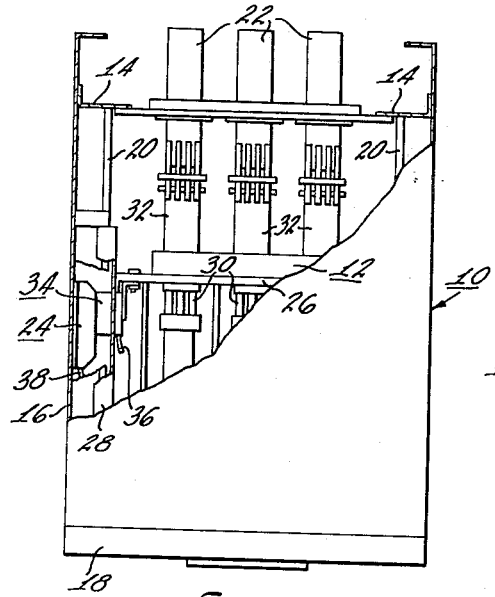
Fig. 1
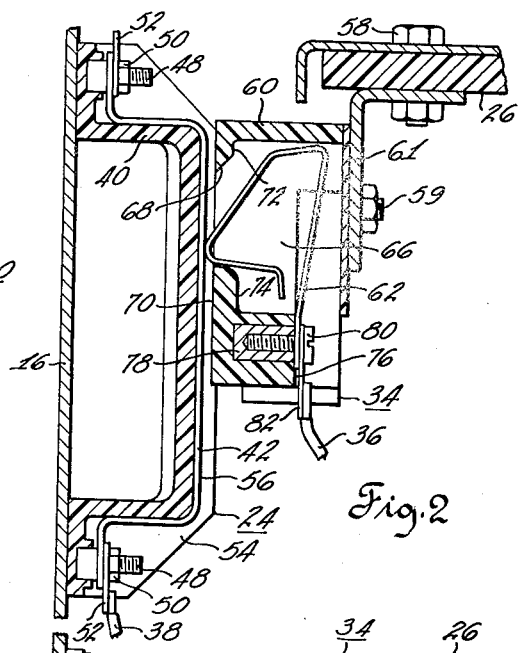
Fig. 2
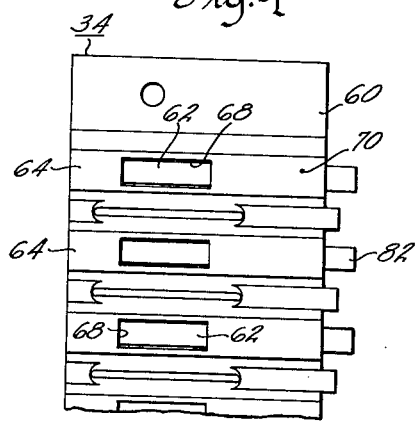
Fig. 4
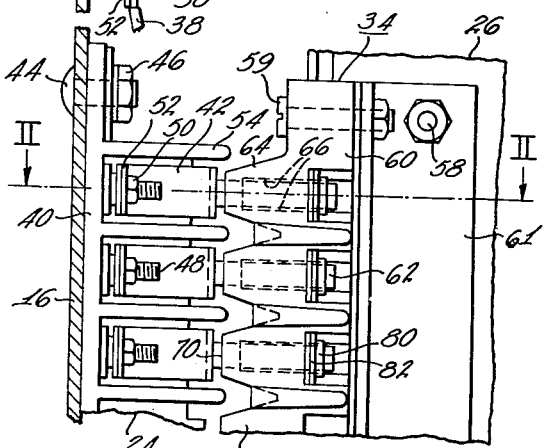
Fig. 3
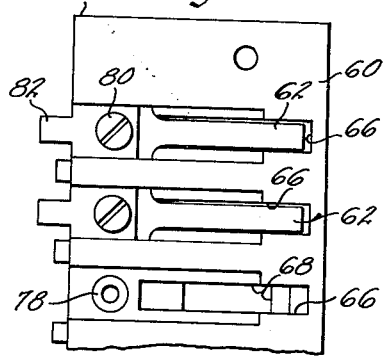
Fig. 5
Fig. 6
Inventors
Edwin C. Goodwin, Jr.
Ira W. Paterson
By Thomas F. Kirby
Attorney

United States Patent Office 3,197,583
Patented July 27, 1965

This invention relates generally to electrical connectors. More particularly, it relates to a secondary disconnect type of connector for connecting secondary circuits on a switchgear housing to secondary circuits on apparatus, such as on a circuit breaker, which is removably mounted in the housing.

Certain types of electric circuit breakers are intended to be slidably mounted in the cubicles of switchgear housings. Such circuit breakers are frequently provided with control devices, relays, motors, and other electrical devices, and with secondary circuits therefor. The secondary circuits on the circuit breakers must be connected to corresponding secondary circuits in the switchgear housing.

In one known type of installation this is accomplished by providing a stationary secondary disconnect element inside the cubicle on a side wall thereof and by providing a movable secondary disconnect element rigidly attached to the side of the circuit breaker for mating with the stationary element when the circuit breaker is slid into the switchgear cubicle. The stationary secondary disconnect element mounted in the switchgear cubicle comprises an insulating base having a row of spaced apart electrically conductive contact bars rigidly mounted thereon. Similarly, the movable secondary disconnect element mounted on the circuit breaker comprises an insulating base having a row of elongated resilient spaced apart electrically conductive fingers or arms mounted thereon and each arm is anchored at one end to the base by a rivet. Thus, when the circuit breaker is inserted into the cubicle, the free ends of the resilient fingers or arms on the movable disconnect element make sliding contact with corresponding bars on the stationary disconnect element. In this type of arrangement the fingers or arms are relatively long so as to be flexible and capable of exerting strong contact pressure without being subject to permanent deformation when flexed. However, such long, straight fingers or arms are unprotected and subject to physical damage when the circuit breaker is inserted into or withdrawn from the cubicle. Furthermore, the long, exposed fingers or arms are subject to accidental short circuiting and grounding as the circuit breaker is being inserted or withdrawn, as during testing. It is desirable, therefore, to provide an improved type of movable secondary disconnect element for mounting on a circuit breaker which retains the advantages of elongated, straight resilient fingers or arms but overcomes the aforesaid disadvantages and has other important advantages.

It is an object of the present invention to provide an improved movable secondary disconnect element employing relatively long, one piece spring type contact fingers or arms which are bent to conserve space and which are mounted on the base in such a manner so as not to reduce the effective length of the arms or weaken the base.

Another object is to provide an improved movable secondary disconnect element empolying predeflected contact fingers or arms which provide high pressure electrical connections with a minimum of deflection during engagement.

Another object is to provide an improved movable secondary disconnect element which is relatively compact, trouble free in operation, readily assembled and disassembled, and employs readily replaceable contact fingers or arms.

Another object is to provide an improved movable secondary disconnect element having enclosed contact arms which are protected against physical damage, which are accurately positioned and maintained with respect to each other and their mounting base, which are supported against side thrust and which are well insulated from each other and from any adjacent grounded structure.

Other objects and advantages will hereinafter appear.

The accompanying drawing illustrates a preferred embodiment of the invention but it is to be understood that the invention illustrated is susceptible to modifications with respect to details thereof without departing from the scope of the appended claim.

In the drawing:

FIG. 1 is a top plan view of a circuit breaker mounted in the cubicle of a switchgear housing and shows a view of the upper ends of a stationary and a movable secondary disconnect element incorporating the present invention in mating relationship;

FIG. 2 is a sectional view of the secondary disconnect elements taken along line II—II of FIG. 3;

FIG. 3 is an enlarged side elevational view of the secondary disconnect elements shown in FIG. 1;

FIG. 4 is a view of the front of the movable secondary disconnect element shown in FIGS. 1, 2 and 3;

FIG. 5 is a view of the back of the movable secondary disconnect element shown in FIG. 4; and FIG. 6 is a view of the movable secondary disconnect element showing one of its contact fingers or arms in unbiased condition.

Referring to FIG. 1, the numeral 10 designates a switchgear housing or assembly having a cubicle in which electrical apparatus, such as a circuit breaker 12, is removably mounted. Switchgear housing 10 is shown, for example, to comprise suitable framework members 14, sheet metal enclosure walls, including a side wall 16, a panel door 18, guide rails 20 for supporting circuit breaker 12 as it is drawn in and out of the cubicle, stationary primary studs 22, and a stationary secondary disconnect element 24. In the embodiment shown, element 24 is shown as rigidly mounted on side wall 16 but it is to be understood that it could be mounted on the opposite side wall or on the top or bottom wall of housing 10.

Circuit breaker 12 is shown, for example, to comprise a suitable framework 26, guides 28 for sliding association with the guide rails 20 of housing 10, primary contacts 30, and primary studs 32 for electrical connection with the stationary primary studs 22 on housing 10. As will be understood, circuit breaker 12 in practice is further provided with auxiliary equipment (not shown) such as a tripping transformer, trip devices, controls, auxiliary switches, and the like, which are associated with secondary electrical circuits, i.e., circuits not directly associated with or electrically connected to the primary contacts 30 or the primary studs 32. These secondary electrical circuits are adapted for connection to a movable secondary disconnect element 34 which is rigidly mounted on the side of circuit breaker 12. In FIGS. 1 and 2, a conductor wire 36 connected to disconnect element 34 is representative of the secondary electrical circuits on circuit breaker 12 and a conductor wire 38 connected to disconnect element 24 is representative of the corresponding secondary electrical circuits on housing 10.

FIGS. 1, 2 and 3 show that when circuit breaker 12 is slid into the cubicle of switchgear housing 10, movable secondary disconnect element 34 slides alongside of and registers with stationary secondary disconnect element 24.

Referring to FIGS. 2 and 3, it is seen that secondary disconnect element 24 comprises an insulating base 40, preferably fabricated by molding, on which a plurality of spaced apart electrically conductive members or contact bars 42 are arranged in a row. As FIG. 3 shows, fastening means such as a bolt 44 and a nut 46 are employed to rigidly secure base 40 to wall 16 of the cubicle of housing 10. Each bar 42 is fabricated of a generally U-shaped elongated strip of metal having holes at either end and is secured at each end to electrically conductive studs or binding posts 48 which are embedded or otherwise rigidly secured to base 40. In the embodiment shown, contact bar 42 is relatively long in order to provide for electrical contact at various positions therealong, i.e., a test position at one point therealong and a final position elsewhere. Nuts 50 on the binding posts 48 secure each bar 42 in position and are also employed to secure electrically conductive lugs 52 to the binding posts. As FIG. 2 shows, the lugs 52 are adapted to have conductors of the secondary circuit, such as conductor 38, electrically connected thereto as by soldering. FIGS. 2 and 3 show that base 40 is provided with a plurality of integrally formed portions 54 which project from the front thereof and extend beyond the contact surfaces 56 of the bars 42. The portions 54 afford a means for electrically insulating adjacent contact bars 42 from each other and for electrically insulating adjacent binding posts 48 from one another. The portions 54 also serve to guide the movable secondary disconnect element 34 into proper position when circuit breaker 12 is inserted into its cubicle.

Referring to FIGS. 2 through 6, movable secondary disconnect element 34, which is constructed in accordance with the present invention, is seen to comprise an insulating base 60, preferably fabricated by molding, and also comprises a plurality of resilient electrically conductive contact fingers or arms 62 arranged in a row on the base. As FIGS. 1 and 2 show, disconnect element 34 is secured to framework 26 of circuit breaker 12 by means such as the bolt and nut assemblies 58 and 59 and the bracket or flange 61. As will be understood, disconnect element 34 is provided with the same number of contact arms 62 as there are contact bars 42 on disconnect element 24. As FIGS. 2 and 6 best show, each contact arm 62 is in the form of a relatively long member which is bent back upon itself to form an irregularly shaped loop. The length of the arm insures proper flexing and resiliency in operation. Bending the arm back upon itself retains the advantages of long length but conserves space. As will be understood, one end of contact arm 62 is provided with a mounting hole (not shown) which adapts it to be secured to base 60 by means hereinafter described. The other end of contact arm 62 is free or unsecured and the looped portion of the contact arm is thus free to be flexed from the position shown in FIG. 6 to that shown in FIG. 2 when depressed. Contact arm 62 is fabricated of resilient material and is prestressed as a result of its configuration and the manner in which it is mounted so that it is not deformed but returns to the position shown in FIG. 6 when it is no longer depressed. Such prestressing insures firm contact pressure between arm 62 and its associated contact bar 42.

It is to be understood, however, that a contact arm constructed in accordance with the present invention need not have the exact configuration of the contact arm 62 but it is important that it be relatively long, bent to conserve space, and arranged so that its free end does not project from a chamber, hereinafter described, in which it is mounted. It is also important that it be almost totally enclosed within its chamber when in contact engaging position.

Base 60 is fabricated so as to have a plurality of projections 64 thereon and to provide an individual recess or chamber 66 within each projection. An opening 68 is provided through the flat surface 70 of each projection 64 for communicating with the recess therewithin. Each chamber 66 is adapted to accommodate an arm 62 and each opening 68 is adapted to accommodate a portion of the loop of the arm which projects therethrough. Disposition of the arm within the chamber insures that it is electrically insulated and physically protected. Preferably, opening 68 is the same width as its associated chamber 66 and the latter is slightly wider than its associated arm 62 in order to limit lateral movement of the arm. Opening 68 is shorter lengthwise than its associated chamber 66 in order to provide shoulders 72 and 74 inside the chamber which limit outward travel of contact arm 62, as FIG. 6 shows. Chamber 66 is sufficiently deep so that contact arm 62 is still enclosed therein even when depressed, as FIG. 2 shows. Base 60 is constructed so as to provide a ledge 76 adjacent each recess 66 in which there is provided a threaded insert 78 which is rigidly attached to base 60 as by being embedded therein. Threaded insert 78 is adapted to accommodate a screw 80 which is employed to rigidly secure arm 62 to base 60. Screw 80 also secures an electrically conductive lug 82 against arm 62. As FIG. 2 shows, lug 82 is adapted to have a secondary circuit conductor, such as conductor 36, electrically connected thereto as by soldering.

The stationary and movable secondary disconnect elements disclosed herein operate and cooperate with each other as follows. With door 18 of the cubicle of switchgear housing 10 open, circuit breaker 12 can be slid into or out of the cubicle. Before circuit breaker 12 is inserted, the contact arms 62 of disconnect element 34 mounted on circuit breaker 12 assume the position shown in FIG. 6, i.e., a smooth, continuous portion of the loop of contact arm 62 projects through opening 68 in base 60 but the free end of the arm does not. As movable disconnect element 34 comes into registry with stationary disconnect element 24, contact arm 62 engages the rounded corner of contact bar 42 on stationary disconnect element 24 and is depressed until it can ride up on and bear against the surface of the contact bar, as shown in FIG. 2. In this position, contact arm 62 is highly stressed and bears firmly against contact bar 42 to insure good electrical contact therebetween. Furthermore, contact arm 62 is depressed so as to be almost totally enclosed in its chamber 66 and is thus well insulated electrically and protected against physical damage. When circuit breaker 12 is withdrawn from the cubicle in switchgear housing 10, the disconnect elements 24 and 34 disengage and contact arm 62 resumes the position shown in FIG. 6.

Having now particularly described and ascertained the nature of our said invention and the manner in which it is to be performed, we declare that what we claim is:

In combination, a switchgear cubicle having a wall, a stationary secondary disconnect element rigidly mounted on said wall, said stationary element comprising an insulating base and a plurality of contact bars mounted in a row in spaced apart relationship on said base, each bar being separated from an adjacent bar by a portion of said insulating base which extends between adjacent bars, switchgear apparatus removably mounted within said cubicle, and a movable secondary disconnect element rigidly mounted on said apparatus in registry with said stationary element, said movable element comprising an insulating base having a plurality of integrally formed spaced apart projections, each projection extending between a pair of adjacent portions of said insulating base of said stationary element and each projection having a recess therewithin and an opening through the top thereof communicating with said recess, and a plurality of electrically conductive contact members, individual members being mounted within their respective recesses, each of said members being in the form of a relatively long resilient strip bent back upon itself to form a loop, and each member having one end anchored and having a portion of said loop extending through said opening, said portion being movable into its respective recess under pressure.

References Cited by the Examiner

UNITED STATES PATENTS

| | | |
|---|---|---|
| 2,767,266 | 10/56 | Hawkins et al. _____ 200—50 |
| 2,786,908 | 3/57 | Constantine et al. _____ 200—50 |
| 2,858,389 | 10/58 | Cuorato et al. _____ 200—50 |
| 3,014,100 | 12/61 | Zablocki _____ 339—258 |

ROBERT K. SCHAEFER, *Acting Primary Examiner.*